United States Patent Office 2,870,787
Patented Jan. 27, 1959

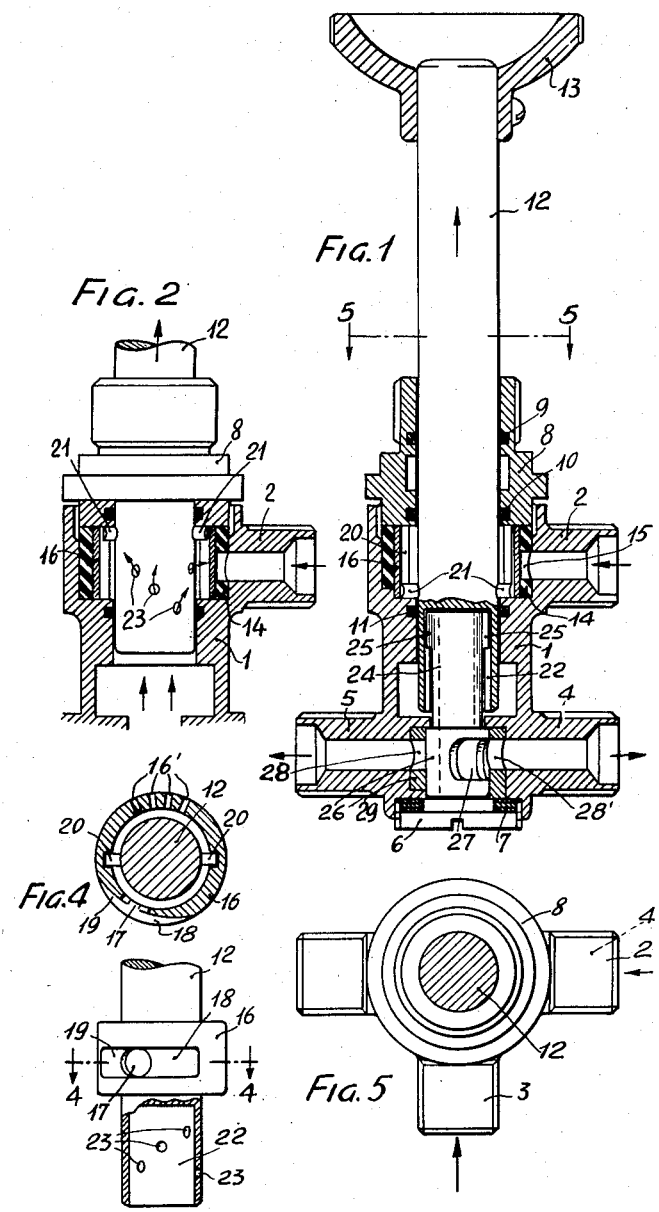

2,870,787

WARM AND COLD WATER MIXING VALVE FOR BATHS, SINKS AND THE LIKE

Rinaldo Rossi, Lodi, Italy

Application May 4, 1956, Serial No. 582,882

Claims priority, application Italy May 5, 1955

2 Claims. (Cl. 137—597)

The present invention relates to a warm and cold water mixing valve with single control for automatic multiple adjustable distribution, applicable on the feed piping of any sanitary installation, that allows, through a simple and fool-proof operation, to adjust the temperature and the flow of the water out of the feed tap of the apparatus. The device is particularly convenient when same has to feed alternatively one or more outlets. In particular, the device is especially suitable for alternatively feeding at will a bath tub or a shower.

The mixing valve in question presents, in respect to other already known similar devices, the feature of having a single control member, and furthermore that of being provided with two coaxial chambers for the mixing and feeding. The advantages therefore of the present device are a very quick mixing, prompt adjustment of the water flow, and easiness of operation.

The accompanying drawing illustrates diagrammatically by way of an example a practical embodiment of the mixing valve which forms the object of the invention, and namely:

Fig. 1 is a view, partially sectioned, of a mixing valve suitable for feeding a bath tub and a shower, wherein the control members are shown in the closed position for either outlet.

Fig. 2 illustrates the central portion of the same device as in Fig. 1, again in an axial section, but with the control member in the mixing and feeding position.

Fig. 3 is a side view, partially sectioned, of the member controlling the mixing.

Fig. 4 is a section view along line 4—4 in Fig. 3.

Fig. 5 is a top view as seen from the line 5—5 in the direction of the arrow, of the mixing valve shown in Fig. 1.

The device in question comprises a body 1 having two inlet taps 2 and 3 respectively for the warm and the cold water, and, at its bottom, spaced from the first ones, two outlet taps 4 and 5, respectively for feeding the bath tub and the shower. The body 1 has a central through bore closed at one end by a plug 6, the tightness being insured by means of gaskets 7.

On the other end of the body 1 there is screwed on, or secured in any other way on the body, a piece 8, also provided with a central axial bore aligned with the bore in the body 1. On said piece 8 there are also shown, inside of same, annular gaskets 9 and 10, another similar gasket being positioned in an opposite annular groove provided on the inside surface of the body 1, as shown at 11 in the drawing. In the axial hole through body 1 and piece 8, there is inserted a stem 12 constituting the operating member, and functioning as a piston. Said stem 12 is provided at its top with an actuating knob 13.

In correspondence with the taps 2 and 3, shown on the body 1, and to which are connected the pipes feeding the warm and cold water, respectively, the central bore in the body 1 is enlarged, forming a seat for a rubber gasket 14 having two holes 15, only one being shown in the drawing, and corresponding, as to their position, to the inlet ducts for the warm and cold water. Inside of said cylindrical, annular rubber gasket 14, there is positioned a metallic piece 16, also of an annular shape, provided with a through hole 17 and two symmetrical grooves 18 and 19 having a height corresponding to the diameter of the hole 17 and a depth decreasing in the direction away from said hole, the length of each of these grooves being less than half the distance between the two inlet ducts 2 and 3. In said piece 16 there are shown a plurality of small holes 16' that are traversed by the mixed water, when the device is in the position for feeding the shower. Said piece 16 presents on its inside surface two diametrically spaced slots 20 wherein the ribs or pins 21 are carired by the stem 12. Therefore the stem 12 can slide axially within the piece 16 guided by the two ribs 21 engaged in the slots 20, and will also cause the piece 16 to rotate with the stem 12 when the latter is caused to rotate.

The stem 12 has its free end provided with a hollow portion 22 within which engages a hollow spindle 24 provided at one end with small wings 25 engaged in corresponding slots shown in the hollow end 22 of the stem 12, and downwardly said spindle 24 has an enlarged portion 26 with a large opening 27 which can be brought to register with one or the other of taps 4 and 5, respectively feeding the bath tub and the shower. Embracing said portion 26 there is a cylindrical annular gasket 29 provided with holes 28 and 28', corresponding to and coaxial with the ducts of the taps 5 and 4. The large opening 27 could be substituted with suitable holes.

The hollow portion 22 of the stem 12 is provided with a plurality of small holes 23 distributed at different levels, for a purpose which will be explained later on. Said small holes could of course be substituted by a groove or other suitable openings.

The control stem 12 can therefore slide axially to completely or partially close the inlets of the warm and cold water into the mixer and can be rotated about its own axis to vary the proportions between warm and cold water fed to the mixer. In Fig. 1 the mixer is shown in the closed position, that is with the inlet of either warm and cold water fully closed. When it is desired to actuate the device, the stem 12 will be raised more or less out of the body 1, and in Fig. 2, the hollow end portion 22 of stem 12 is shown in its position of maximum opening. In said position, the stem 12 may be turned in either direction according to whether it is desired to have the mixed water warmer or colder. When the stem 12 in rotated it will cause the rotation of the piece 16, whose hole 17, if brought to register for instance with the duct of the tap 2 for the warm water, will allow warm water only to pass to the inside of the mixer, through the hole 15 of the gasket 14, the hole 17 and the small holes 23 on the end 22 of the stem 12. Should instead said stem 12 be rotated, and together with same the piece 16, the hole 17 will be displaced and the grooves 19 and 18 will allow the flow of a certain quantity of water, respectively cold and warm, larger or smaller according to the relative position taken up by the piece 16 in respect to the inlet points of the warm and cold water. It is obvious therefore how through a very simple and quick operation it is possible to control and vary at will the temperature of the water coming out from the mixer.

The mixed water will be fed through the tap 4 to the bath tub, if this is desired, and in this instance, always upon acting on the stem 12, the hollow spindle member 24 will be rotated so that the opening 27, provided on its lower portion 26, will be in register with the hole 28' on the gasket 29, as well as with the outlet tap 4, leading to the bath. If instead it is desired to feed the water mixed in said mixing device to the shower, it will suffice, always upon actuation of the stem 12, to rotate the spindle 24 so that said opening 27 be in register with the hole 28 of the gasket 29, and the outlet tap 5, leading to the shower.

As shown in Fig. 1 the tap is closed and no water enters the mixer. When it is desired to feed hot water to the bath, stem or shaft 12 is pulled outwardly and rotated whereby the end portion 22 which is provided with the holes 23 reaches the position of Fig. 2, in which case the hot water entering from 2, will flow through the hole 17 of the bushing 16; said hole will be in front of the inlet 2, while the small holes 16' will be staggered in respect to the inlet 3 of the cold water, that is, bushing 16 will keep the inlet of the cold water duly closed, while it will allow the hot water to flow in. The hot water will flow through holes 23 and will reach the inside of the element 22, and through the hole 27 it will reach the pipe 28 feeding the bath.

When it is desired to feed the shower without moving axially the rod 12, said rod is made to rotate to a corresponding external mark, which is conventional in these mixing devices, and in such position the hole 27 will register with the port 28, which connects with shower, and bushing 16 will be disposed with the small holes 16' in the zone corresponding to the feeding pipe 2 while the holes 17 and grooves 18 and 19 will be closed by the wall portion of the tap body.

When it is desired to distribute tepid water to the bath, the shaft 12 will be rotated in order that a pointer which is steady with it, may be disposed into an intermediate position between the conventional marks H and C (hot and cold). Bushing 16 will rotate and before tap pipe 2 there will be disposed the groove 19, while before tap pipe 3 there will be at least some one of the holes 16', through which mixed water will pass to feed the shower. Said rotation has such an amplitude that the opening 27 (rather large at its corners) will be always before the opening 28' reaching the bath.

When it is desired to interrupt the distribution of water, the rod or shaft 12 will be lowered. Whenever it is desired to provide the shower with mixed water, the rod 12 will be rotated, in order that the hole 27 may register with hole 28, and the hole 17 or the groove 19 may be brought to register with the pipe 3 and the small holes 16' with the pipe 2.

Of course the control handle 13 will be provided with the conventional pointer, which moves upon the conventional plate, said plate having at the right side the indications relating to the bath and on its left side, at 180° will bear the indication relating to the shower. On both sides of said plate, upon which the pointer is sliding, there will be, besides the generic indications bath and shower, two further marks symmetrically spaced, from said central mark, and corresponding one to the water fully hot and the other to the water fully cold, while the intermediate positions of the pointer, and thus of the shaft 12, will give water more or less hot.

From the above description it is apparent how easy it is to actuate the mixing device and the advantages offered by the device in question. In fact, the mixing chamber and the distributing chamber in this mixing device are coaxial and placed aligned with each other, which is convenient from several points of view, while the actuation of the device is effected through a single control member, namely the stem 12 with knob 13, which is a new feature in devices of this kind.

Of course the constructive details of the above described members may vary according to needs without departing from the scope of the present invention.

What I claim is:

1. A mixing device for warm and cold water for the selective feeding of bath and shower, comprising a metallic body provided with four branching taps, two of said taps being positioned at the same level for the inlet to the mixer of the warm and the cold water respectively, and two other branching taps aligned in opposite directions and spaced axially from the first taps, to feed water to the bath and the shower, a bushing aligned with the two inlet taps inside the body, said bushing being of non-metallic material and provided with openings in register with the two branch taps, an annular cylindrical metallic member inside said bushing provided with holes and tapered recesses for the admission of the warm and cold water, a control stem slidably and rotatably mounted within the body, ribs on said stem, said cylindrical member being engaged with the stem by means of two longitudinal inner grooves along two diametrically opposite sides thereof within which are engaged the ribs of said stem, the lower portion of said stem being hollow and having grooves and small holes in the wall thereof, said small holes being in communication with the holes and tapered recesses of the cylindrical metallic member when the control stem is raised, a shut-off position in said mixing device when the stem is lowered, a hollow spindle seated in said hollow lower portion and having small wings engaging the last mentioned grooves and an opening which may be brought to register with either of said outlet taps, according to whether it is desired to feed the bath or the shower, said last mentioned opening being of enlarged configuration to permit intermediate rotation of the stem, said hollow spindle being actuated by means of the control stem.

2. A mixing device as set forth in claim 1, wherein the interconnecting means between said hollow spindle with the control stem will permit only rotary movement of the stem to the spindle, and an annular bushing interposed between said spindle and the outlets for the bath and shower and provided with diametrically opposed openings to selectively register with either outlet for feeding water to the bath or shower.

References Cited in the file of this patent

UNITED STATES PATENTS

| | | |
|---|---|---|
| 669,649 | Meyer | Mar. 12, 1901 |
| 1,693,758 | Hennessey | Dec. 4, 1928 |
| 1,882,953 | Saelzler | Oct. 18, 1932 |
| 1,886,889 | Krupp | Nov. 8, 1932 |
| 2,563,955 | Pearse | Aug. 14, 1951 |